US007934984B2

(12) United States Patent
Jensen et al.

(10) Patent No.: US 7,934,984 B2
(45) Date of Patent: May 3, 2011

(54) SYSTEM AND METHOD FOR PROVIDING A PLURALITY OF GAMES

(75) Inventors: Peter Jensen, Heathcote (AU); Ali Jomaa, Heathcote (AU); Dean Wright, Taren Point (AU); Stephen Cowan, Taren Point (AU)

(73) Assignee: Paltronics Australasia Pty Limited, New South Wales (AU)

( * ) Notice: Subject to any disclaimer, the term of this patent is extended or adjusted under 35 U.S.C. 154(b) by 980 days.

(21) Appl. No.: 11/596,324

(22) PCT Filed: Apr. 29, 2005

(86) PCT No.: PCT/AU2005/000615

§ 371 (c)(1), (2), (4) Date: Nov. 13, 2006

(87) PCT Pub. No.: WO2005/107912

PCT Pub. Date: Nov. 17, 2005

(65) Prior Publication Data

US 2008/0132310 A1 Jun. 5, 2008

(30) Foreign Application Priority Data

| | | |
|---|---|---|
| May 10, 2004 | (AU) | 2004902460 |
| May 10, 2004 | (AU) | 2004902465 |
| May 10, 2004 | (AU) | 2004902469 |
| Jan. 20, 2005 | (AU) | 2005900239 |

(51) Int. Cl.
*G06F 17/00* (2006.01)

(52) U.S. Cl. .......... 463/16

(58) Field of Classification Search .......... 463/16–25
See application file for complete search history.

(56) References Cited

U.S. PATENT DOCUMENTS 5,116,055 A 5/1992 Tracy
5,280,909 A 1/1994 Tracy
(Continued)

FOREIGN PATENT DOCUMENTS

AU 714299 B1 12/1999
(Continued)

OTHER PUBLICATIONS

European Patent Office. Supplementary European Search Report. Name of Applicant: Paltronics Australasia Pty Limited. International Application No. PCT/AU2005/000615. English Language. 3 pages. Mar. 3, 2009.

(Continued)

*Primary Examiner* — Ronald Laneau
(74) *Attorney, Agent, or Firm* — Sterne, Kessler, Goldstein & Fox, P.L.L.C.

(57) ABSTRACT

A system for providing a plurality of games is disclosed in which a plurality of user-operable terminals (1) provide respective players with a primary game, and generate primary game information messages relating to the primary game. A second game controller (2) receives the primary game messages and uses the information contained therein to administer a secondary game having an associated prize. The secondary game controller generates a tertiary game trigger message when the secondary game is won, and a tertiary game controller (5) responds the tertiary game trigger message by offering the secondary game winning player an opportunity to play a tertiary game using all or a portion of the secondary game prize as a stake.

38 Claims, 6 Drawing Sheets

U.S. PATENT DOCUMENTS

| | | | | |
|---|---|---|---|---|
| 5,393,057 | A | 2/1995 | Marnell, II | |
| 6,012,982 | A | 1/2000 | Piechowiak et al. | |
| 6,062,981 | A | 5/2000 | Luciano, Jr. | |
| 6,110,043 | A | 8/2000 | Olsen | |
| 6,155,925 | A | 12/2000 | Giobbi et al. | |
| 6,224,482 | B1 | 5/2001 | Bennet | |
| 6,238,855 | B1 | 9/2001 | Bingham | |
| 6,312,333 | B1 | 11/2001 | Acres | |
| 6,358,149 | B1 | 3/2002 | Schneider et al. | |
| 6,471,591 | B1 | 10/2002 | Crumby | |
| 6,565,434 | B1 | 5/2003 | Acres | |
| 6,585,592 | B1 | 7/2003 | Crumby | |
| 6,652,378 | B2 * | 11/2003 | Cannon et al. | 463/20 |
| 6,656,048 | B2 | 12/2003 | Olsen | |
| 7,517,281 | B2 * | 4/2009 | Baerlocher | 463/25 |
| 2003/0036429 | A1 | 2/2003 | Witty et al. | |
| 2003/0073482 | A1 | 4/2003 | Baerlocher et al. | |
| 2003/0162588 | A1 | 8/2003 | Brosnan et al. | |
| 2004/0053679 | A1 | 3/2004 | Getz et al. | |
| 2004/0087368 | A1 | 5/2004 | Gauselmann | |
| 2004/0106446 | A1 * | 6/2004 | Cannon et al. | 463/16 |
| 2006/0142079 | A1 * | 6/2006 | Ikehara et al. | 463/27 |

FOREIGN PATENT DOCUMENTS

| | | | |
|---|---|---|---|
| AU | 2003/203674 | B1 | 10/2003 |
| AU | 2003/246319 | B2 | 10/2003 |
| AU | 783417 | B2 | 10/2005 |
| EP | 0 874 337 | A1 | 10/1998 |
| EP | 1 336 941 | A2 | 8/2003 |
| EP | 1336941 | A2 | 8/2003 |
| GB | 2 139 390 | A | 11/1984 |
| JP | 2001/195359 | A | 7/2001 |
| WO | WO 96/12262 | A1 | 4/1996 |
| WO | WO 01/15790 | A1 | 3/2001 |
| WO | WO 02/32523 | A1 | 4/2002 |
| WO | WO 02/103586 | A1 | 12/2002 |
| WO | WO 2005/008514 | A1 | 1/2005 |
| WO | WO 2005/042123 | A1 | 5/2005 |
| WO | WO 2005/083599 | A1 | 9/2005 |
| WO | WO 2005/107899 | A1 | 11/2005 |
| WO | WO 2005/107901 | A1 | 11/2005 |
| WO | WO 2005/107913 | A1 | 11/2005 |
| WO | WO 2005/107914 | A1 | 11/2005 |

OTHER PUBLICATIONS

European Patent Office. European Office Action dated Apr. 24, 2009. Applicant: Paltronics Australasia Pty Limited. European Application No. 05 735 883.0-1238. 4 pages.

* cited by examiner

SYSTEM AND METHOD FOR PROVIDING A PLURALITY OF GAMES

The present invention relates to a system and method for providing a plurality of games.

The invention has been developed primarily for use with a plurality of interlinked gaming machines in a gaming establishment and will be described with reference to this application. However, the invention is not limited to that particular field of use and is also suitable for use with online gaming, gaming machines that are distributed over a plurality of gaming establishments, lotto, pools, lotteries, art unions, bingo, raffles and other games involving one or more wagers being placed upon an outcome having a finite probability of occurring.

BACKGROUND

The discussion of the prior art within this specification is to assist the addressee to understand the invention and is not an admission of the extent of the common general knowledge in the field of the invention and is included without prejudice.

It is known to link gaming machines to provide a number of additional functionalities. This includes the ability to control the awarding of a prize, as the pool of available finds is greater and the amount of finds available is known rather than having to be estimated. Another known purpose of interlinking gaming machines is to provide secondary gaming such as a linked jackpot. In such a system, a central display typically provides the players with a visual indication of a presently available jackpot prize which is increased incrementally as the players operate the interlinked gaming machines. It is known by the players that the prize will be awarded when it reaches a secret, randomly selected value that is less than a predetermined limit value. The limit value is often also visually indicated to the players by means of the display.

The use of such functionality is intended to attract players to play the machines in the hope of winning the jackpot. However, with the increased sophistication of players and their increased exposure to such systems, the systems' ability to maintain players' interest has diminished.

It is an object of the present invention to overcome, or at least substantially ameliorate, one or more of the disadvantages of the prior art or at least to provide a useful alternative.

SUMMARY OF THE INVENTION

A first aspect of the invention provides a system for providing a plurality of games including a plurality of user-operable terminals for providing respective players with a primary game and for generating primary game information messages, a secondary game controller responsive to the primary game information messages for providing the players with a linked secondary game having an associated prize and for generating a tertiary game trigger message when the secondary game is won, and a tertiary game controller responsive to the tertiary game trigger message for offering the secondary game winning player an opportunity to play a tertiary game using all or a portion of the secondary game prize as a stake.

Preferably the plurality of user-operable terminals include respective input devices for allowing users to accept or reject an offered tertiary game.

The input devices are preferably also adapted to allow the users to indicate a proportion of the secondary game prize to be used as the tertiary game stake.

Preferably the tertiary game controller is responsive to the tertiary game being won for offering a further opportunity to play the tertiary game.

Preferably the tertiary game controller includes memory for storing counter data indicative of the number of times the tertiary game has been played, and a processor for incrementing the counter data each time the tertiary game is played.

In such embodiments, the tertiary game controller preferably further includes a comparator for comparing the counter data with at least one predetermined value.

Preferably the at least one predetermined value includes a predetermined limit value and the tertiary game controller offers the tertiary game if the counter data is less than the predetermined limit value.

Additionally or alternatively the at least one predetermined value may include a bonus prize value, the tertiary game controller awarding a bonus prize when the counter data equals the bonus prize value.

Preferably the tertiary game has a prize equal to double its stake.

In a preferred embodiment, the secondary game controller is located centrally in a central controller, which preferably further includes a display driver for causing a display screen to show information relating to the secondary and tertiary games.

The tertiary game controller may also be centrally located in the central controller.

However, another preferred embodiment includes a respective tertiary game controller for each user-operable terminal, the tertiary game controllers preferably being collocated with their respective user-operable terminals. The tertiary game controllers may be, for example, located on respective network cards attached to respective user-operable terminals.

In the preferred embodiment, the secondary game is a linked jackpot, which is awarded in a time-dependent or an event-dependent manner. In the latter case, the secondary game controller preferably includes memory for storing a predetermined jackpot value and a accrued prize value, a processor for adjusting the accrued prize value in response to the primary game information messages, a comparator for comparing the accrued prize value and the predetermined jackpot value and the processor is responsive to the comparator for awarding the secondary game prize when the accrued prize value reaches the predetermined jackpot value.

A second aspect of the invention provides a method of providing a plurality of games including the steps of providing a primary game to a plurality of players at respective user-operable terminals which generate primary game information messages, receiving the primary game information messages at a secondary game controller, responding to the messages by providing a linked secondary game having an associated prize, and generating a tertiary game trigger message when the secondary game is won, and receiving the tertiary game trigger message at a tertiary game controller and responding to the tertiary game trigger message by offering the secondary game winning player an opportunity to play a tertiary game using all or a portion of the secondary game prize as a stake.

The method preferably further includes receiving at the user-operable terminals a player indication of a desire to accept or reject an offered tertiary game.

The method preferably further includes receiving at the user-operable terminals a player indication of a desired proportion of the secondary game prize to be used as the tertiary game stake.

In the preferred embodiment, the method includes, when the tertiary game is won, offering a further opportunity to play the tertiary game.

In this embodiment, the method preferably further includes storing at the tertiary game controller counter data indicative of the number of times the tertiary game has been played, and incrementing the counter data each time the tertiary game is played.

The counter data is preferably compared with at least one predetermined value, for example a predetermined limit value and the tertiary game is offered if the counter data is less than the predetermined limit value. Additionally or alternatively, the counter data is compared with a bonus prize value and a bonus prize awarded when the counter data equals the bonus prize value.

In the preferred embodiment, the tertiary game has a prize equal to double its stake.

Preferably the secondary game is a linked jackpot, which is awarded in a time-dependent or an event-dependent manner. In the latter case, the method preferably includes the further steps of storing at the secondary game controller a predetermined jackpot value and a accrued prize value, adjusting the accrued prize value in response to the primary game information messages, comparing the accrued prize value and the predetermined jackpot value, and awarding the secondary game prize when the accrued prize value reaches the predetermined jackpot value.

BRIEF DESCRIPTION OF THE DRAWINGS

Preferred embodiments of the invention will now be described, by way of example only, with reference to the accompanying drawings, in which.

DETAILED DESCRIPTION

Figure 1:
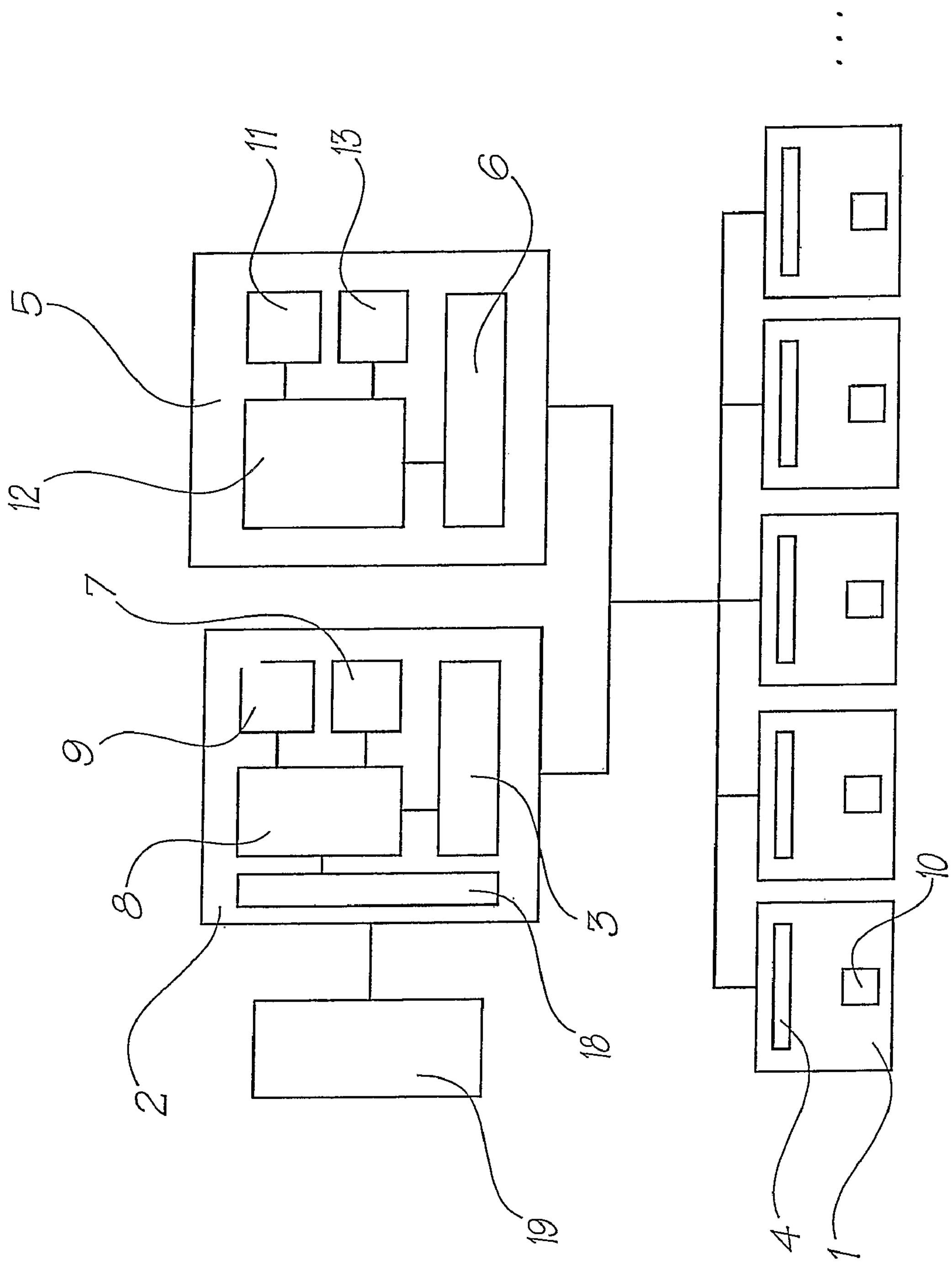
FIG. 1 is a schematic view of a first system according to the invention.

Referring to FIG. 1, there is illustrated a first example of a system for providing a plurality of games. The system includes a plurality of user-operable terminals 1 for providing respective players (not shown) with a primary game and for generating primary game information messages. The user-operable terminals are in communication with a secondary game controller 2 via an interface card 3 in the secondary game controller 2 and respective network cards 4 in the user-operable terminals. The secondary game controller 2 receives the primary game information messages and provides the players with a linked secondary game having an associated prize. In addition, the secondary game controller generates a tertiary game trigger message when the secondary game is won.

A tertiary game controller 5 receives the tertiary game trigger message by means of an interface card 6 and responds by offering the secondary game winning player an opportunity to play a tertiary game using all or a portion of the secondary game prize as a stake.

In the preferred embodiment, the secondary game is a linked jackpot game, in which the jackpot is awarded in an event-dependent manner when an accrued turnover amount reaches a predetermined threshold. Such a system is disclosed in copending PCT application no. PCT/AU2004/001444, which is incorporated by reference below. In this kind of system, the secondary game controller 2 includes memory 7 for storing a predetermined jackpot value and an accrued prize value. A secondary game controller processor 8 adjusts the accrued prize value in response to the primary game information messages generated by the user-operable terminals 1. A comparator 9 compares the accrued prize value and the predetermined jackpot value. The secondary game controller processor 8 responds to the comparator by awarding the secondary game prize when the accrued prize value reaches the predetermined jackpot value.

However, in an alternative embodiment, the linked jackpot is awarded in a time-dependent manner. In such a system, the primary game information messages serve merely to notify the secondary game controller 2 of which user-operable terminals 1 are active and therefore eligible to receive the linked jackpot.

In yet a further alternative embodiment, in which the linked jackpot is awarded in an event-driven manner, the user-operable terminals 1 indicate to the secondary game controller that a linked jackpot should be awarded when a particular event arises on a user-operable terminal, for example three kings showing on a poker game. The secondary controller responds by advising the tertiary game controller of the value of the prize and the identity of the winning user-operable terminal.

To allow users to accept or reject an offered tertiary game, the plurality of user-operable terminals include respective input devices 10 in the form of buttons or a touch-screen, for example. In a particularly preferred embodiment, the input devices also allow the users to indicate a proportion of the secondary game prize to be used as the tertiary game stake, the remainder of the secondary game prize being paid to the user.

The tertiary game controller 5 includes memory 11 for storing counter data indicative of the number of times the tertiary game has been played, a predetermined limit value indicative of the maximum number of times the tertiary game will be offered, and at least one bonus prize value indicative of points at which a bonus prize will be awarded to the user. The memory 11 also stores data indicative of the current prize value. The tertiary game controller 5 further includes a processor 12 for incrementing the counter and for executing the tertiary game and a comparator 13 for comparing the counter with the predetermined limit value and the bonus prize values.

In an example embodiment described with reference to FIG. 5, the tertiary game is a game of chance having two possible outcomes, for example high-low. The payouts are nil for a lose and two times stake for a win. A limit value of 5 and bonus values of 3 and 5 are stored in the tertiary game controller memory 11. The user-operable terminals 1 are electronic gaming machines (EGMs) having memory for storing data indicative of a credit meter, i.e. funds available for payout or for staking on the primary game.

When the secondary game controller 2 awards its prize to a particular EGM, it sends a tertiary game trigger message identifying the winning EGM and the value of the jackpot prize. The tertiary game controller 5 responds, at step S1, by storing the jackpot prize value, in this case $1000, and initializing the counter to zero.

In some embodiments, communication between the user of the winning EGM and the tertiary game controller 5 is effected by the passing of messages between the EGM network card 4 and the tertiary game controller interface card 6, by the display of appropriate prompts and information on the EGM screen and by user input via the EGM input device 10. In other embodiments, there is no tertiary game controller interface card 6; the EGM network cards 4 communicate directly with the tertiary game controller 5 using a proprietary interface. The user of the EGM identified in the tertiary game trigger message is then asked, at step S2, whether he or she wishes to play the tertiary game. The EGM receives user input via the input device 10 and the input is passed to the tertiary game controller 1. If the user does not wish to play the tertiary game, the prize is paid to the EGM credit meter at step S3, and the tertiary game process is terminated. If the user does wish to play the tertiary game, he or she is presented, at step S4, with an opportunity to choose whether to stake 50% or 100% of the current prize value. Input is again received via the EGM input device 10.

If the user elects to gamble 50%, half of the prize value is paid to the EGM credit meter, at step S5, and the stored prize value is reduced by 50%. In either case, at step S6 the tertiary game is then executed by the tertiary game controller processor 12, taking user input where necessary, for example to choose "higher" or "lower", etc.

The tertiary game controller 5 checks at step S7 whether the game has been won. If not, the tertiary game procedure is terminated at step S8 with no prize being paid to the EGM credit meter. If the game has been won, the stored prize value is doubled and the counter is incremented at step S9.

At step S10, the tertiary game controller comparator 13 then compares the counter with the bonus prize values. If the counter equals either of the values, that is in the present case if the tertiary game has been won 3 or 5 times, a bonus prize is paid to the EGM credit meter. The amount of the bonus prize is predetermined and may be stored for example in the tertiary game controller memory 11. At step S12, the tertiary game controller comparator 13 then compares the counter with the predetermined limit value. If the counter equals the limit value, that is in the present case if the tertiary game has been won 5 times, the currently stored prize value is paid to the EGM credit meter at step S3 and the tertiary game procedure is terminated. If the counter is not equal to the limit value, that is if the tertiary game has been won fewer than 5 times, the user is presented, at step S13 with the option to repeat the tertiary game. If the user elects not to repeat, the currently stored prize value is paid to the EGM credit meter at step S3 and the tertiary game procedure is terminated. If the user decides that he or she does wish to repeat the tertiary game, flow returns to step S6 and the tertiary game is executed again.

Figure 5:
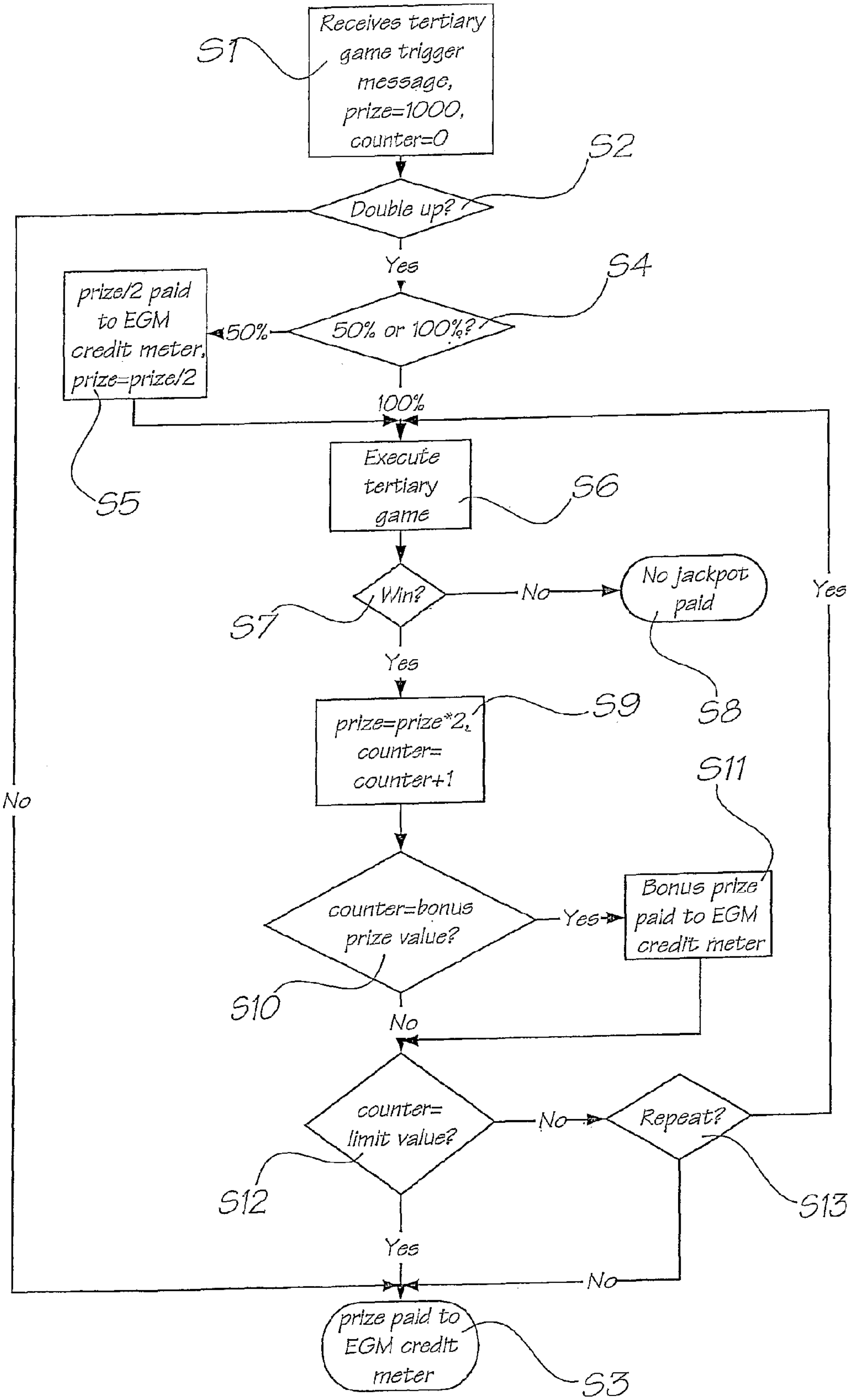
FIG. 5 is a flowchart showing illustrating a preferred method according to the invention.
Figure 6:
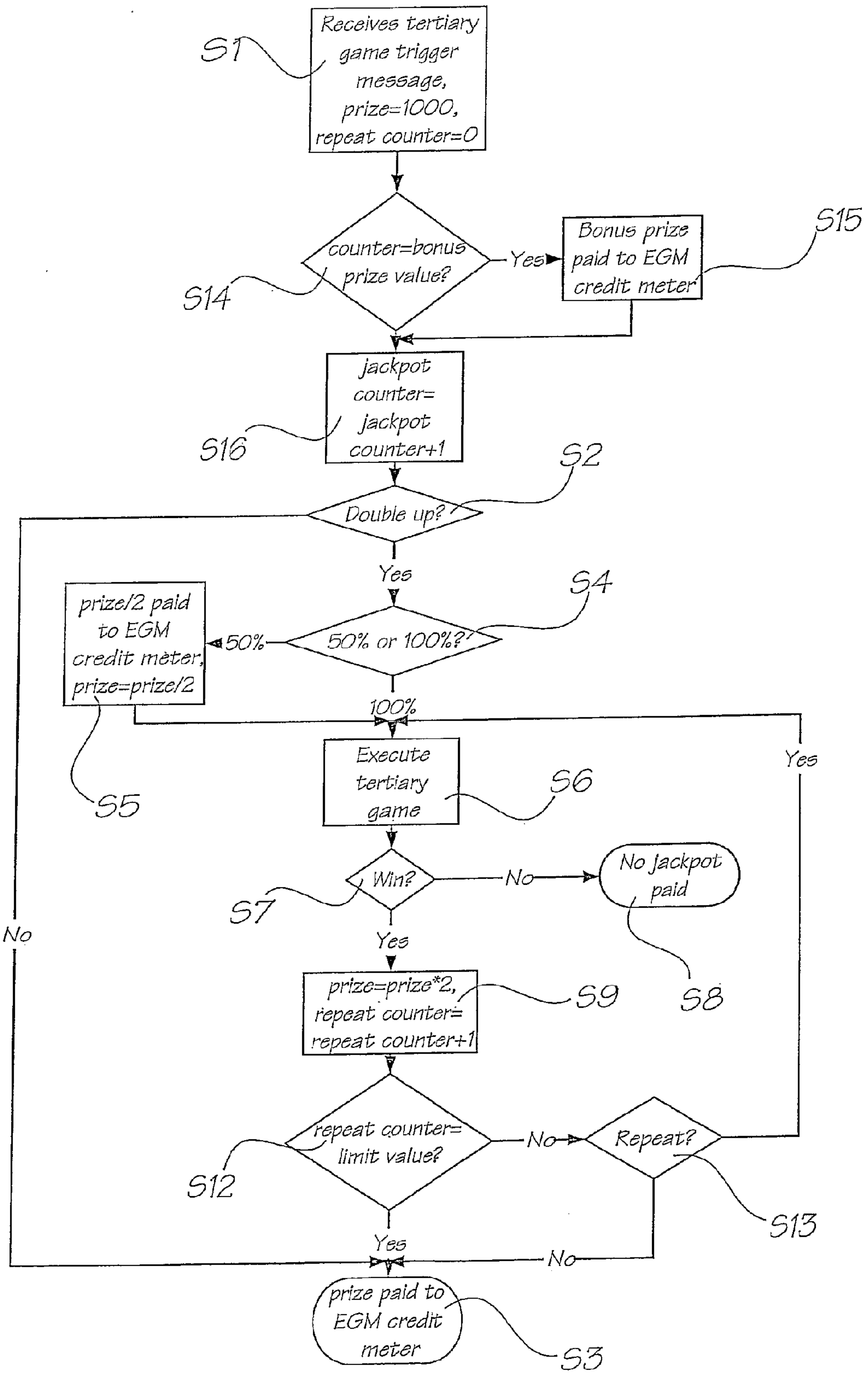
FIG. 6 is a flowchart illustrating a further preferred method according to the invention.

In another class of preferred methods, illustrated in FIG. 5, the payment of bonus prizes is handled in a different way. In these embodiments, the tertiary game controller memory 11 stores a jackpot counter and a repeat counter. The jackpot counter is reset periodically and/or it is reset when the system is first initialized. In various embodiments the jackpot counter is reset at various intervals, for example, minutes, hours, days, weeks, and so on.

As in the previously-described embodiment, the tertiary game controller 5 stores the jackpot prize value at step S1. However, the tertiary game controller comparator 13 then compares the jackpot counter with the bonus prize values at S14. If the jackpot counter equals either of the values, that is if a the present jackpot is the third or fifth since the jackpot counter was last reset, a bonus prize is paid to the EGM credit meter at step S15. In any case, the jackpot counter is then incremented at step S16. The method then proceeds through steps S4 to S8 as in the previously-described embodiment. If the tertiary game is won, the prize value is doubled and the repeat counter is incremented at step S9. The method then proceeds through steps S12 and S13 as in the previously-described embodiment and terminates at step S3 with payment of the accrued prize to the EGM credit meter.

Figure 2:
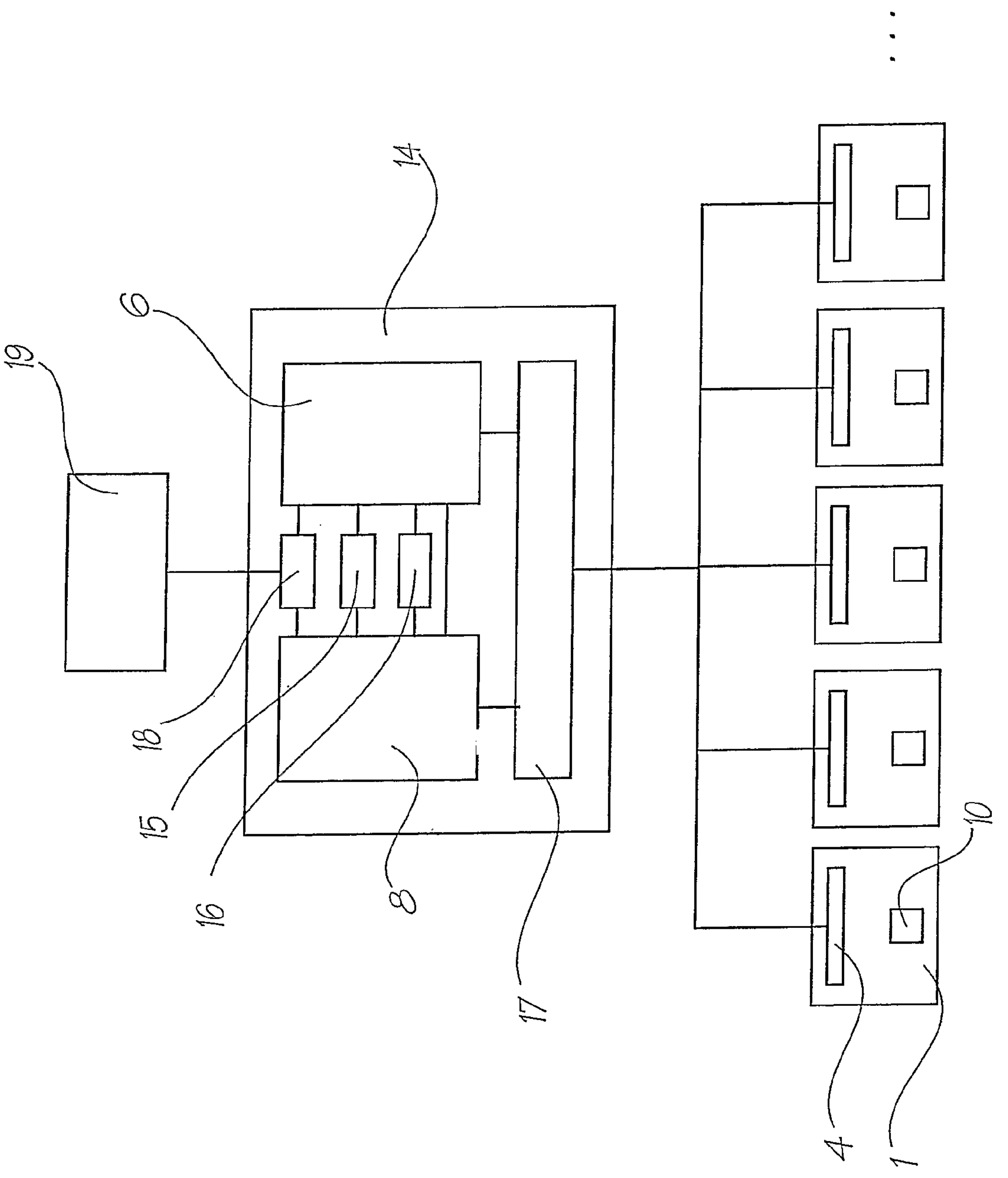
FIG. 2 is a schematic view of a second system according to the invention.

In the embodiment described above with reference to FIG. 1, the secondary and tertiary game controllers 2, 5 are distinct. In an alternative embodiment shown in FIG. 2, a central controller 14 is provided which includes a secondary game controller processor 8 and a tertiary game controller processor 12 which share memory 15, a comparator 16 and an interface card 17. The central controller also includes a display controller 18 for causing a display screen 19 to show information relating to the secondary and tertiary games.

Figure 3:
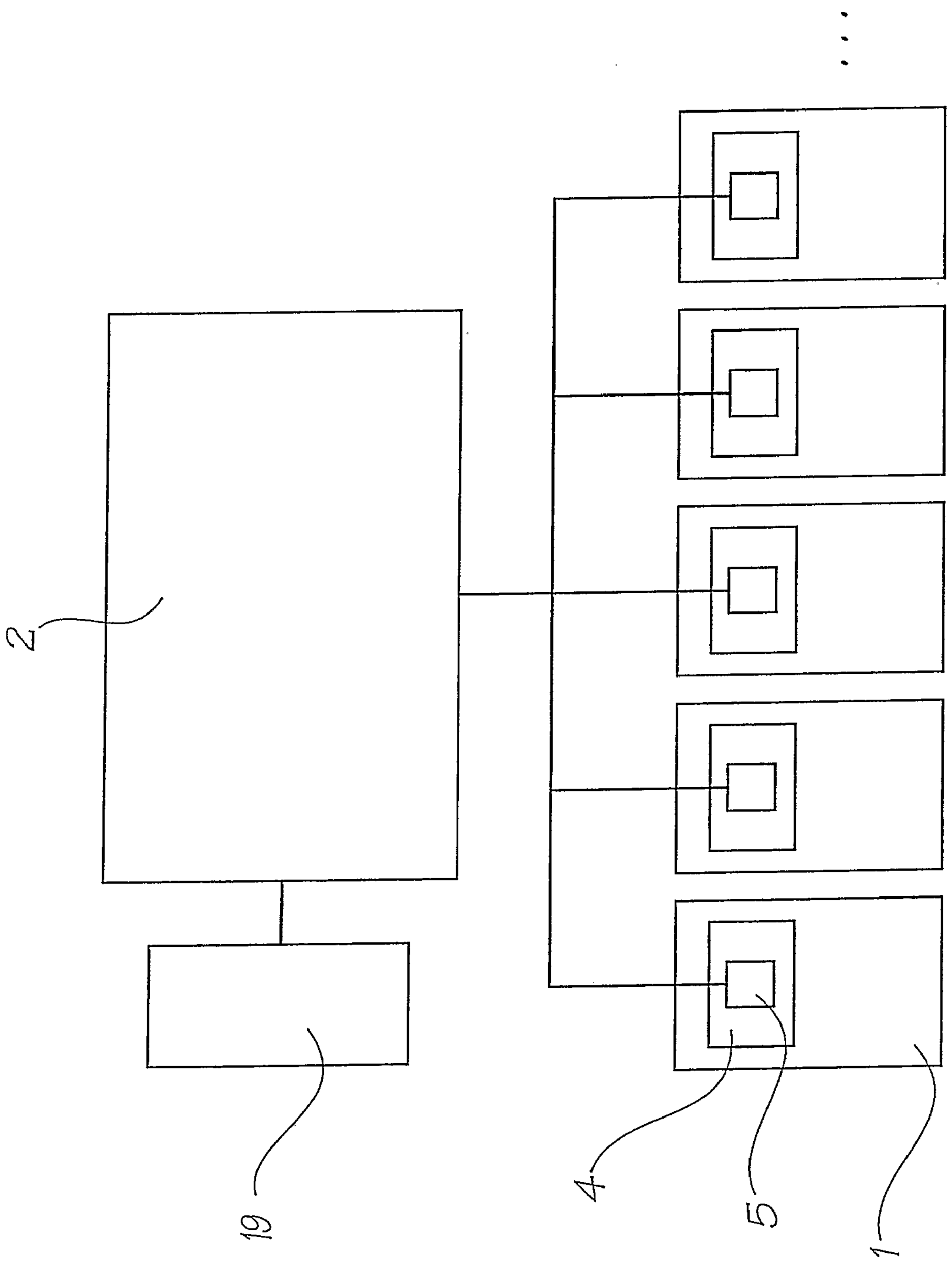
FIG. 3 is a schematic view of a third system according to the invention.

In a further alternative embodiment shown in FIG. 3, in which the secondary game controller 2 is as shown in FIG. 1, a respective tertiary game controller 5 is present on each of the network cards 4 of the user-operable terminals 1 and the tertiary game is executed locally to the winning EGM.

Figure 4:
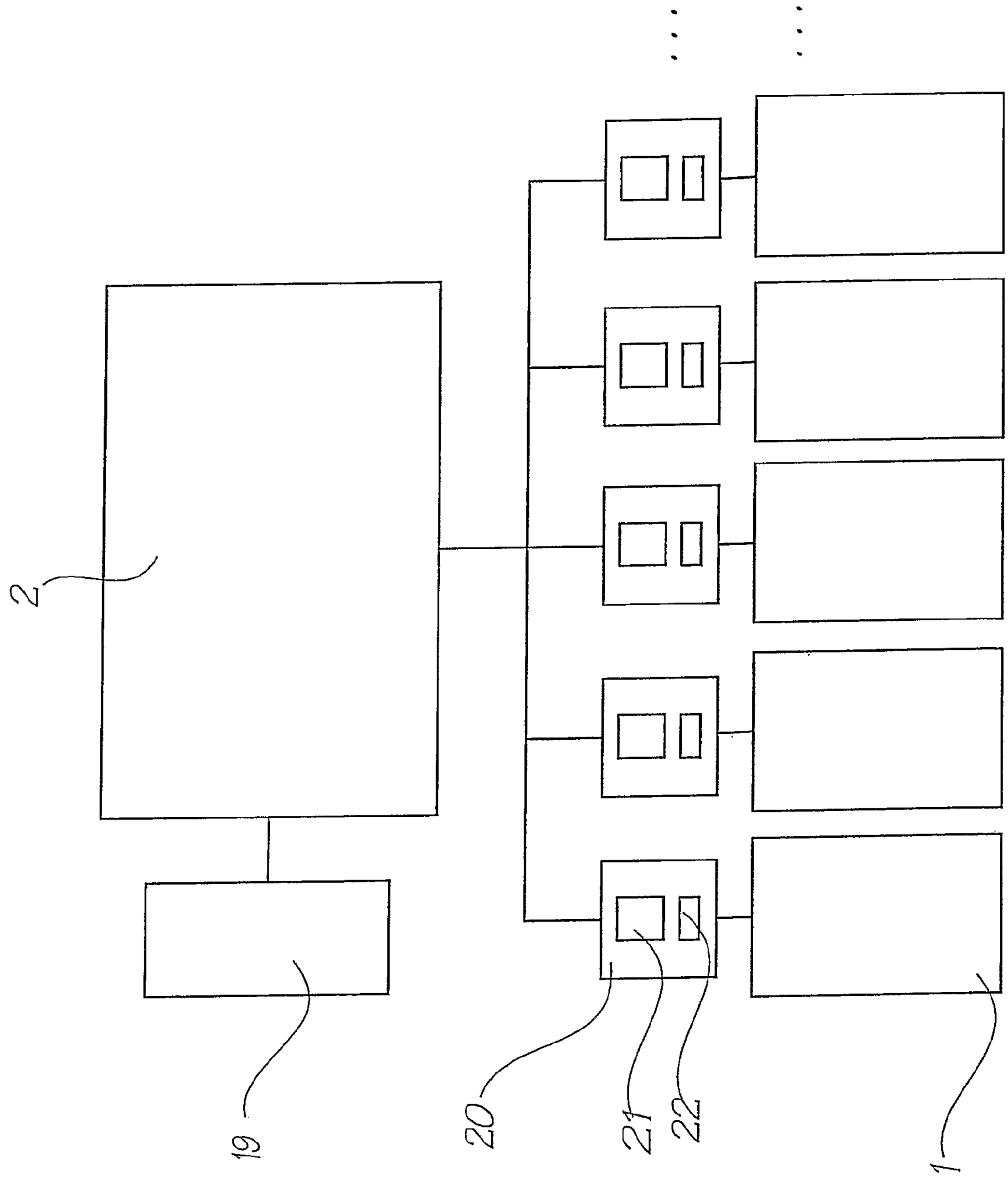
FIG. 4 is a schematic view of a fourth system according to the invention.

In yet a further embodiment shown in FIG. 4, respective tertiary game devices 20 are provided adjacent each EGM. The tertiary game devices each include respective tertiary game information screens 21, controlled by tertiary game screen drivers 22, and tertiary game input devices 22 for displaying information to and receiving input from players using the EGMs.

In each of the above embodiments, a winning user may collect his or her winnings in a known manner. For example, payment may be made from a local cash hopper, funds permitting, by payment to an account or a smartcard, by issuing of a voucher which may be redeemable at a cashier, etc.

In each of the above embodiments, the display controller 18 causes the display screen 19 to show information relating to the secondary game, e.g. a linked jackpot game. In some embodiments in which tertiary game information is provided on a screen local to the secondary game winning EGM, for example the embodiment described with reference to FIG. 4, information specific to the tertiary game is only displayed on the tertiary game display 21 associated with the secondary game winning EGM. However, in alternative embodiments, to further encourage interest in the gaming system, the display controller also causes the display screen to display information relating to the tertiary game including, for example, information relating to a user's decision to play the tertiary game, information relating to a user's decision as to the proportion of the prize to stake on the tertiary game and information relating to whether or not the tertiary game is won or lost. Some embodiments of the invention are provided in a single gaming establishment in which the user-operable terminals are EGMs at the establishment. In alternative embodiments, the user-operable terminals are distributed among a number of such establishments or other locations and/or the terminals include other devices such as personal computers. In such latter cases, communication between the terminals and the secondary game controller (and the tertiary game controller when centralised) is effected for example by means of an existing network, such as the internet, or by telephone dial-up or radio communication or by a combination of the above.

Although the invention has been described with reference to specific examples, it will be appreciated by those skilled in the art that it may be embodied in many other forms. In particular features of any one of the various described examples may be provided in any combination in any of the other described examples.

In further embodiments, systems according to the invention are provided in, or in combination with, the systems disclosed in copending Australian patent application numbers 2003903769, 2004902460, 2003905792, 2004902465, 2004900978, 2004905518, 2004902469, 2004902459 and 2004906409 and PCT application no PCT/AU2004/001444.

Furthermore, the functionality of various components-such as the secondary game controller and the tertiary game controller—have been described as being performed by distinct devices, such as dedicated integrated circuits. However, in preferred embodiments, all or any combination of their functionality is instead performed by multi-purpose integrated circuits or implemented in software executed on a microprocessor. Particularly in such cases, the invention is additionally embodied in a computer program or in a computer program in a data signal or stored on a data carrier.

The claims defining the invention are as follows:

1. A system for providing a plurality of games including:

a plurality of user-operable terminals for providing respective players with a primary game and for generating primary game information messages;

a secondary game controller responsive to the primary game information messages for providing the players with a linked secondary game having an associated prize and for generating a tertiary game trigger message when the secondary game is won; and a tertiary game controller responsive to the tertiary game trigger message for offering the secondary game winning player an opportunity to play a tertiary game using all or a portion of the secondary game prize as a stake and is further responsive to the tertiary game being won for offering a further opportunity to play the tertiary game, the tertiary game controller including:

memory for storing counter data indicative of the number of times the tertiary game has been played;

a processor for incrementing the counter data each time the tertiary game is played; and a comparator for comparing the counter data with at least one predetermined value, wherein the at least one predetermined value includes a predetermined limit value and the tertiary game controller offers the tertiary game if the counter data is less than the predetermined limit value.

2. A system according to claim 1 wherein the plurality of user-operable terminals include respective input devices for allowing users to accept or reject an offered tertiary game.

3. A system according to claim 2 wherein the input devices are adapted to allow the users to indicate a proportion of the secondary game prize to be used as the tertiary game stake.

4. A system according to claim 1 wherein the tertiary game has a prize equal to double its stake.

5. A system according to claim 1 wherein the secondary game controller is centrally located in a central controller.

6. A system according to claim 5 wherein the central controller further includes a display controller for causing a display screen to show information relating to the secondary and tertiary games.

7. A system according to claim 5 wherein the tertiary game controller is centrally located in the central controller.

8. A system according to claim 1 including a respective tertiary game controller for each user-operable terminal.

9. A system according to claim 8 wherein the tertiary game controllers are collocated with their respective user-operable terminals.

10. A system according to claim 9 wherein the tertiary game controllers are located on respective network cards attached to respective user-operable terminals.

11. A system for providing a plurality of games including:

a plurality of user-operable terminals for providing respective players with a primary game and for generating primary game information messages;

a secondary game controller responsive to the primary game information messages for providing the players with a linked secondary game having an associated prize and for generating a tertiary game trigger message when the secondary game is won; and a tertiary game controller responsive to the tertiary game trigger message for offering the secondary game winning player an opportunity to play a tertiary game using all or a portion of the secondary game prize as a stake and is further responsive to the tertiary game being won for offering a further opportunity to play the tertiary game; the tertiary game controller including:

memory for storing counter data indicative of the number of times the tertiary game has been played;

a processor for incrementing the counter data each time the tertiary game is played; and a comparator for comparing the counter data with at least one predetermined value, wherein the at least one predetermined value includes a bonus prize value and wherein the tertiary game controller awards a bonus prize when the counter data equals the bonus prize value.

12. A system according to claim 11 wherein the plurality of user-operable terminals include respective input devices for allowing users to accept or reject an offered tertiary game.

13. A system according to claim 12 wherein the input devices are adapted to allow the users to indicate a proportion of the secondary game prize to be used as the tertiary game stake.

14. A system according to claim 11 wherein the tertiary game has a prize equal to double its stake.

15. A system according to claim 11 wherein the secondary game controller is centrally located in a central controller.

16. A system according to claim 15 wherein the central controller further includes a display controller for causing a display screen to show information relating to the secondary and tertiary games.

17. A system according to claim 15 wherein the tertiary game controller is centrally located in the central controller.

18. A system according to claim 11 including a respective tertiary game controller for each user-operable terminal.

19. A system according to claim 18 wherein the tertiary game controllers are collocated with their respective user-operable terminals.

20. A system according to claim 19 wherein the tertiary game controllers are located on respective network cards attached to respective user-operable terminals.

21. A system for providing a plurality of games including:

a plurality of user-operable terminals for providing respective players with a primary game and for generating primary game information messages;

a secondary game controller responsive to the primary game information messages for providing the players with a secondary game in the form of a linked jackpot game awarded in an event-dependent manner having an associated prize and for generating a tertiary game trigger message when the secondary game is won, the secondary game controller including:

memory for storing a predetermined jackpot value and an accrued prize value;

a processor for adjusting the accrued prize value in response to the primary game information messages; and a comparator for comparing the accrued prize value and the predetermined jackpot value;

wherein the processor is responsive to the comparator for awarding the secondary game prize when the accrued prize value reaches the predetermined jackpot value; and a tertiary game controller responsive to the tertiary game trigger message for offering the secondary game winning player an opportunity to play a tertiary game using all or a portion of the secondary game prize as a stake.

22. A system according to claim 21 wherein the plurality of user-operable terminals include respective input devices for allowing users to accept or reject an offered tertiary game.

23. A system according to claim 22 wherein the input devices are adapted to allow the users to indicate a proportion of the secondary game prize to be used as the tertiary game stake.

24. A system according to claim 21 wherein the tertiary game has a prize equal to double its stake.

25. A system according to claim 21 wherein the secondary game controller is centrally located in a central controller.

26. A system according to claim 25 wherein the central controller further includes a display controller for causing a display screen to show information relating to the secondary and tertiary games.

27. A system according to claim 25 wherein the tertiary game controller is centrally located in the central controller.

28. A system according to claim 21 including a respective tertiary game controller for each user-operable terminal.

29. A system according to claim 28 wherein the tertiary game controllers are collocated with their respective user-operable terminals.

30. A system according to claim 29 wherein the tertiary game controllers are located on respective network cards attached to respective user-operable terminals.

31. A system according to claim 21 wherein the linked jackpot is awarded in a time-dependent manner.

32. A method of providing a plurality of games, comprising:

providing a primary game to at a plurality of user-operable terminals configured to generate primary game information messages, and configured to be operated by respective players;

at a secondary game controller:

receiving from one or more of the user-operable terminals the primary game information messages, responding to the messages by providing a linked secondary game having an associated prize, and generating a tertiary game trigger message when the secondary game is won; and at a tertiary game controller:

receiving the tertiary game trigger message, responding to the tertiary game trigger message by offering the secondary game winning player an opportunity to play a tertiary game using all or a portion of the secondary game prize as a stake, when the tertiary game is won, offering a further opportunity to play the tertiary game, storing data indicative of the number of times the tertiary game has been played, and incrementing the data each time the tertiary game is played, and comparing the data with a predetermined limit value and offering the tertiary game if the counter data is less than the predetermined limit value.

33. A method according to claim 32 including receiving at the user-operable terminals a player indication of a desire to accept or reject an offered tertiary game.

34. A method according to claim 33 including receiving at the user-operable terminals a player indication of a desired proportion of the secondary game prize to be used as the tertiary game stake.

35. A method according to claim 32 wherein the tertiary game has a prize equal to double its stake.

36. A method of providing a plurality of games, comprising:

providing a primary game at a plurality of user-operable terminals configured to generate primary game information messages, and configured to be operated by respective players;

at a secondary game controller:

receiving from one or more of the user-operable terminals the primary game information messages, responding to the primary game information messages by providing a linked secondary game in the form of a linked jackpot game awarded in an event-dependent manner having an associated prize, and generating a tertiary game trigger message when the secondary game is won;

at a tertiary game controller:

receiving the tertiary game trigger message, and responding to the tertiary game trigger message by offering the secondary game winning player an opportunity to play a tertiary game using all or a portion of the secondary game prize as a stake; and at the secondary game controller:

storing a predetermined jackpot value and an accrued prize value, adjusting the accrued prize value in response to the primary game information messages, comparing the accrued prize value and the predetermined jackpot value, and awarding the secondary game prize when the accrued prize value reaches the predetermined jackpot value.

37. A method according to claim 36 including receiving at the user-operable terminals a player indication of a desire to accept or reject an offered tertiary game.

38. A method according to claim 37 including receiving at the user-operable terminals a player indication of a desired proportion of the secondary game prize to be used as the tertiary game stake.

* * * * *